(No Model.) 2 Sheets—Sheet 2.
R. J. GÜLCHER.
THERMO ELECTRIC GENERATOR.
No. 383,464. Patented May 29, 1888.
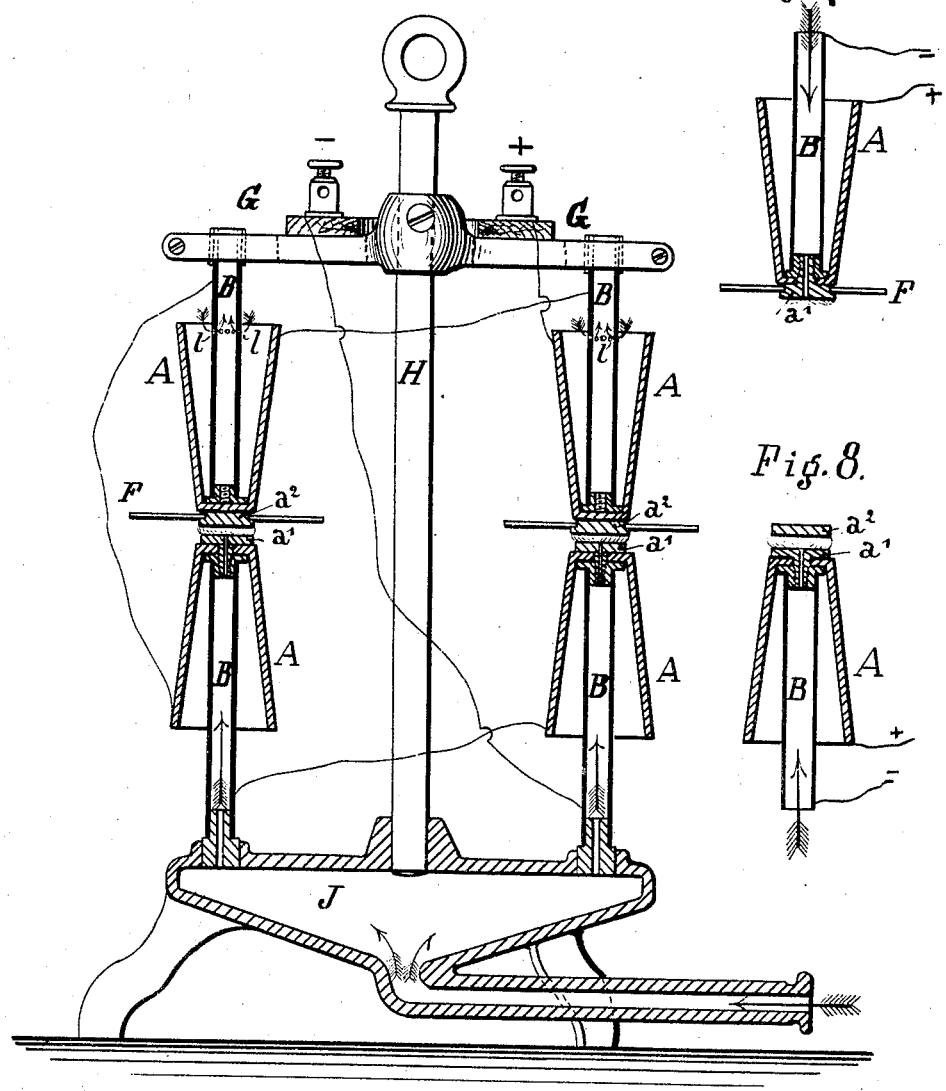
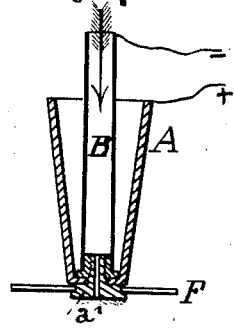
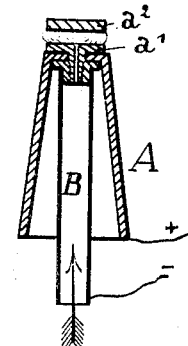
Witnesses:
C. T. Belt.
L. B. Porter.
Inventor.
R. J. Gülcher,
by Herbert W. T. Jenner,
Attorney.

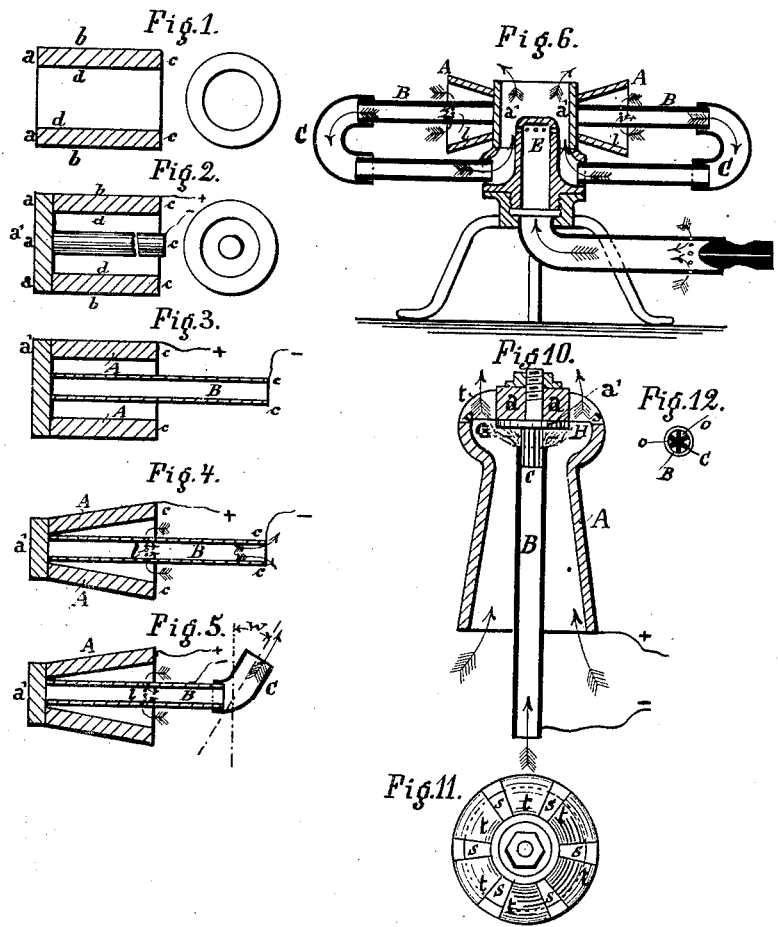

UNITED STATES PATENT OFFICE.

ROBERT JACOB GÜLCHER, OF BERLIN, GERMANY.

THERMO-ELECTRIC GENERATOR.

SPECIFICATION forming part of Letters Patent No. 383,464, dated May 29, 1888

Application filed January 18, 1888. Serial No. 261,130. (No model.)

*To all whom it may concern:*

Be it known that I, ROBERT JACOB GÜLCHER, engineer, a subject of the King of Prussia and German Emperor, residing at the city of Berlin, in the Kingdom of Prussia and German Empire, have invented certain new and useful Improvements in Thermo-Electric Elements and Piles; and I do hereby declare the following to be a full, clear, and exact description of the invention, such as will enable others skilled in the art to which it appertains to make and use the same.

This invention relates to that description of thermo-electric elements in which a direct conversion of heat into electricity is effected according to known thermo-electric principles; and it has for its object on the one hand to increase the useful effect of these elements, and on the other hand to adopt such arrangements as will afford advantages in their practical construction. These conditions are, in the first instance, complied with by making the thermo-electric bars of which the elements or piles are composed, not, as heretofore, of solid bodies, but of hollow bodies, and so arranged that only their smallest base-surfaces are used for heating, while all the other surfaces are used for cooling the elements. By this means not only is the electro-motive force produced greater for one and the same expenditure of heat and the same mass of thermo-electric material, but also, as proved by experiment, the proportion of the length of the thermo-electric bars to their outer diameter, which is necessary for producing the greatest useful effect, is more favorable than heretofore. Thus while, for instance, with a solid cylindrical bar of a certain alloy, the greatest electro-motive force was obtained when the length of the bar was from eight to ten times greater than the diameter, the requisite proportion between length and diameter for producing the greatest effect was reduced to from 0.9 to 1.0 when the bar was made hollow, while retaining the same outer diameter, and with this construction the electro-motive force of the hollow cylinder was even greater than with the solid bar of eight to ten times the length. By means of this considerable reduction in the necessary length of the thermo-electric bars not only is a great saving in thermo-electric material effected, but the still greater advantage is attained that the electrical resistance of the thermo-electric elements is considerably decreased, so that by the use of hollow bodies in place of solid bars (with the same quantity of heat) not only a higher electro-motive force, but also a stronger current, is obtained.

Figures 1 to 5 show, respectively, various forms of hollow thermo-electric elements in longitudinal section. Fig. 6 is a vertical section through a series of hollow thermo-electric elements combined together and provided with a Bunsen burner. Fig. 7 is a vertical section through a single pair of elements supplied with a downward current of gas and a burner-orifice. Fig. 8 is a similar view to Fig. 7, but inverted, and having the current of gas entering from below. Fig. 9 is a vertical section through a battery built up of a series of single elements, as shown in Figs. 7 and 8. Figs. 10 and 11 show, respectively, a vertical section and a plan view of two single thermo-electric elements arranged one within the other. Fig. 12 is a cross-section on line G H in Fig. 10.

The simplest form of hollow body which is suitable for the purposes of the present invention is the above-mentioned hollow cylinder shown at Fig. 1 of the accompanying drawings. With this form only the annular surface $a$ is heated, while the other surfaces, $b\ c\ d$, serve for radiating the heat, and consequently for cooling the element. The annular surfaces $a$ and $c$ form the two poles of the element. The hollow bodies may, however, receive other forms suitable for the said purpose. They may, for example, be formed as hollow parallelopipeds of square, rectangular, triangular, or other polygonal cross-section, or as hollow cones or frustums, pyramids, and the like. The essential feature of the present invention is the same in either case—namely, that of forming the element as a hollow body. The cause has not as yet been fully explained; but it is a fact, determined by long-continued experiments, that even without a continual increase of the section through which the current passes (as with cones, pyramids, &c.) the proportion between the length and the outer diameter of the thermo-electric bars requisite for producing the greatest effect is a much more favorable one than heretofore when these bars are made of hollow bodies. The total amount of cooling-surface plays only a subordinate part in this phenomenon, as is shown by the above-mentioned example.

I will now describe the different modifications of the above-described improved construction of thermo-electric elements by the use of hollow bodies, as also the combinations of these with known and new arrangements for practically carrying out the invention.

In the first place, the inner space of the hollow body may be utilized by the introduction therein of a solid bar, also of thermo-electric material, as shown in Fig. 2. The surfaces, $a$ $a$, to be heated are connected by a metal piece, $a'$, which serves both for conveying the heat to these surfaces, as also for the conducting-connection thereof. The action of such a compound element can, however, as is shown by what has been before stated, be considerably increased if, in place of introducing a solid bar, a second hollow body is introduced into the first one. The form of such inner hollow body may be similar to that of the outer one, or it may be different therefrom. The inner hollow body may also be either of the same material as the outer one, or it may be of a different thermo-electric material, as shown at Fig. 3. The two hollow bodies are in this case supposed to be connected in series; but they may also be arranged in parallel. When the two hollow bodies are of different material, they may, of course, also be either of the same or of a different form.

Fig. 3 shows, by way of example, the combination of two hollow cylinders. Fig. 4 shows the combination of a hollow frustum of a cone with a hollow cylinder. The action of such a combined element may also be further increased by providing the inner hollow body with air-holes $l$ somewhat below the edge of the outer hollow body, as shown at Fig. 4. In each pair of elements there is then produced a continuous circulation of air, that assists the cooling thereof, the air entering the interior of the larger hollow body and passing through the air-holes into the interior of the inner body, from the end of which it again escapes into the atmosphere, as indicated by the arrows. This circulation of air and its beneficial action are increased if the outer open end of the inner body is provided with a chimney or air-flue, C, Fig. 5. These latter may be made of suitable material; but they must be so formed that in building up several elements to form a pile or battery the current of warm air rising up from the chimneys does not come in contact with the elements above it or their chimneys. For this purpose it is advantageous to arrange the chimneys at a sufficient inclination, W, from the vertical, as shown at Fig. 5.

A still better action is produced if the chimneys or air-flues C of each pair of elements are led, insulated from each other, to the heating-space common to all in such manner that this space is quite isolated from the outer air, and is only fed with warmed air from the chimneys in a similar manner to the regenerative heating and lighting apparatus. Fig. 6 shows a diagram of such an arrangement with a thermo-column composed of several elements.

A A are the outer and B B the inner hollow bodies of the elements.

C C are the insulated air-flues, which conduct the warmed air into the common heating-chamber, where it effects the combustion of the gases issuing from the Bunsen burner E. The arrows indicate the direction of the air-currents. The several elements are insulated from each other and from the heating-chamber, and can be arranged either in parallel or in series.

The combustion-gases rising in the combustion-chamber draw the air required for the combustion from the flue C, whereby on the one hand the circulation of the air, and consequently the cooling of the elements, is increased, and on the other hand the combustible gases are fed with warmed air, whereby an increased heat is produced in the combustion-chamber. Thus both an increased cooling and an increased heating of the elements are effected, resulting in an increased production of electro-motive force.

In addition to the hereinbefore-stated advantages that arise from the use of hollow bodies and their combinations to thermo electric elements, and which have the effect of producing a comparatively high electro-motive force with a small internal resistance of the elements, other important advantages may be attained thereby, which with the simplest possible construction result in the best possible utilization of the source of heat, and consequently also a very considerable saving of fuel.

Although an apparatus constructed according to the arrangement shown in Fig. 6 already acts more economically than the thermo-columns heretofore used for the above-stated reasons, yet the loss of heat with such an apparatus is still considerable. The common heating-chamber absorbs for the heating of its walls, from which the heat is transmitted to the elements, a considerable amount of heat; furthermore, a large quantity of heat escapes upward from the heating-chamber and is entirely lost; and, lastly, the heating apparatus itself (i. e., at Fig. 6 the Bunsen burner E) absorbs considerable heat without utilizing such heat for the production of electricity. These considerable losses of heat are entirely obviated if the elements formed of hollow bodies are so arranged that they can themselves be made to serve as their own heating apparatus. This is effected, in the first instance, if the inner hollow body of each pair of elements is used for the conduction of the combustible gases, and if the ends of both the hollow bodies that have to be heated are provided with one or more openings communicating with the inner hollow body, through which the gases can issue and can enter into combustion immediately at the ends of the hollow bodies that have to be heated. Thus if, for example, as shown at Fig. 7, such a pair of elements is arranged vertically with the heated ends downward, the interior of the inner body, B, being connected with the gas-supply pipe and the gas issuing from a small hole in the bottom be ignited, it will in burning apply itself in circular form to the common connecting-plate a', (as on account of its lower specific gravity it will tend to rise on issuing,) coming all round in contact with the air, and thus producing perfect combustion—that is, producing a blue smokeless flame, as with a Bunsen burner. The heat thus produced is by this arrangement almost entirely absorbed by the end of the pair of elements to be heated, and it is sufficient to provide the plate a' with a disk, F, of mica, asbestus, or other bad conductor of heat, of a larger diameter than the end of the outer body, A, in order to protect the upper part of the latter from the radiated heat of the flame and the current of hot air rising up therefrom. The gas passing down through the inner body, B, also has a cooling effect upon the upper part thereof. The same result is obtained if a similar pair of elements is placed in an inverted vertical position, as at Fig. 8, a plate, $a^2$, being fixed at a certain distance from the upper end. By this means the issuing gas is spread out, and in that case also burns with a blue flame, which will be in contact with the surface of the plate a', so as to heat the same. As, however, by this arrangement, the heat given off to the plate $a^2$ will be lost, it will be evident that it would be of advantage to replace that plate by a second pair of elements, having its heated end $a^2$ downward, as at Fig. 9, thus leaving a space between the two in which the flame burns, so that this serves to heat the two pairs of elements simultaneously, thus effecting a still greater economy of fuel. The upper pair of elements are, as before, provided with a disk, F, of mica, for protecting the upper part from the heat.

The inner upper body, B, may be provided with lateral holes l, for effecting air-circulation, as previously described.

It will be evident that instead of supplying the gas through the lower inner elements it may be made to pass down through the upper ones, as at Fig. 7; but the arrangement shown at Fig. 9 would appear to be the most practical. Fig. 9 also shows the arrangement for combining several pairs of elements to a pile or battery. J is a hollow stand, which is connected by a nozzle with the gas-supply, and from which the gas passes into the several lower inner hollow bodies, B, fixed thereon, the corresponding set of upper elements being carried by a standard, H, having radial arms G. The combination of two hollow thermo-electric bodies arranged one within the other may, lastly, also be arranged with much advantage for forming their own heating apparatus in such manner that instead of heating their surfaces from the outside they are heated from the inside. Figs. 10, 11, and 12 show, respectively, a vertical section, a plan, and a cross-section at G H, Fig. 10, of such an arrangement.

The inner hollow body, B, serves to conduct the combustible gas; but it is not connected directly with the heating-plate a', but by means of a metal piece, C, brazed into the same, of star-shaped section, in such manner that a space of a certain size is formed between the plate a' and the end surface of the body B. By this means there are formed within the edge of the body B several small openings, o, Fig. 12. The metal piece C serves at the same time both for effecting the electrical connection between the two hollow bodies and for transmitting the heat to the body B.

The outer hollow body, A, is bulged out at its base in order to afford the flame sufficient room within it, and it is provided with openings (preferably slits) s, through which the combustion-gases escape. The bars t, formed between these slits, are made to increase considerably in transverse section toward the base-surface, in order that the bars t may effectually take up the heat and conduct it to the base a. Pairs of elements thus arranged are preferably fixed vertically upon a gas-chamber common to all, in a manner similar to the lower pairs of elements at Fig. 9. The gas passes in this arrangement up the body B and through the openings o, where it enters into combustion inside the body A, with the air-supply rising up through the latter. A flame of annular shape giving no smoke will again result, heating the plate a' to a high degree. The heat of the combustion-gases issuing through the slits s will, in great measure, be taken up by the bars t, which conduct it, as above stated, to the base a. It will be readily understood that this arrangement will give a greater useful effect than those previously described, not only because the heat is utilized to the greatest extent, but also because by the combustion of the gas within the body A and the issue of the combustion-gases through the slits s a strong current of air from outside toward and up through the body A is produced, whereby the lower open end of the latter is effectually cooled, and consequently the difference of temperature between the two ends and the resulting electro-motive force will be increased. The cooling of the body B is effected, as in the previous arrangements, by the current of gas flowing through it. With this arrangement, however, a special device for igniting the gas-jet inside the element is required. This consists simply of a two-way cock common to all the elements combined in a battery, arranged so that in one position it permits more gas to flow through than is required for actuating the elements. When the cock is in this position, the gas issues through the slits s and is ignited outside, so that it burns over the element with a blue flame. After a few minutes the elements will have attained the degree of heat at which the above-mentioned circulation of air is sufficiently strong to feed an internal flame with sufficient air to effect perfect combustion. The flame will then shift from the outside through the slits s to the inside, where it will burn within the edge of the body B. The cock is then turned into its second position, so as to supply the elements with only the amount of gas requisite for their proper action.

It is to be understood that the pairs of elements are suitably insulated from each other and from the other parts of the apparatus, and that they may be connected either in series or in parallel. In the diagram at Fig. 9 they are shown connected in series.

The pairs of elements may be made of any size, according to the strength of current required, and any number of them may be combined in one apparatus, according to the electro-motive force required. It is advantageous to arrange the pairs of elements in concentric circles. Several such apparatus may also be combined together.

Having thus described my invention, and also the manner how and the means with which it is to be performed, what I claim, and desire to get granted by Letters Patent of the United States, is—

1. A thermo-electric element consisting of a hollow cylindrical body provided with a small base-surface at one end for receiving heat and a large cooling-surface, substantially as and for the purpose set forth.

2. A thermo-electric element consisting of a hollow body provided with a small base-surface for receiving heat and a large cooling-surface, in combination with a second thermo-electric body arranged within the first one, substantially as and for the purpose set forth.

3. A thermo-electric element consisting of a hollow body provided with a small base-surface for receiving heat and a large cooling-surface, in combination with a second hollow thermo-electric body arranged within the first one, substantially as and for the purpose set forth.

4. A thermo-electric element consisting of a hollow body provided with a small base-surface for receiving heat and a large cooling-surface, in combination with a second hollow thermo-electric body arranged within the first one and provided with lateral air-holes somewhat below the edge of the said outer body, substantially as and for the purpose set forth.

5. The combination, with a series of external hollow thermo-electric elements, A, of the internal elements, B, the chimneys C, connected to the said elements B, and a heating-chamber common to all the elements and connected to the said chimneys, substantially as and for the purpose set forth.

6. The combination, with an external hollow thermo-electric element, of a second internal element provided with a central passage for gas, and a burner-hole common to both elements, substantially as and for the purpose set forth.

7. The combination of an external hollow thermo-electric element, and a second internal element provided with a central passage for gas, and a burner-hole common to both elements, with a second pair of external and internal elements similar to the first pair, and arranged with the heated ends of each pair opposite to each other, substantially as and for the purpose set forth.

In testimony whereof I affix my signature in presence of two witnesses.

ROBERT JACOB GÜLCHER.

Witnesses:
MARC M. RATTEN,
B. ROI.